US011679368B2

(12) United States Patent
Jean et al.

(10) Patent No.: US 11,679,368 B2
(45) Date of Patent: *Jun. 20, 2023

(54) PROCESS-INTENSIFIED FLOW REACTOR

(71) Applicant: CORNING INCORPORATED, Corning, NY (US)

(72) Inventors: Patrick Jean, Le Chatelet en Brie (FR); Elena Daniela Lavric, Avon (FR)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/517,104

(22) Filed: Nov. 2, 2021

(65) Prior Publication Data
US 2022/0055009 A1 Feb. 24, 2022

Related U.S. Application Data

(63) Continuation of application No. 16/635,069, filed as application No. PCT/US2018/044572 on Jul. 31, 2018, now Pat. No. 11,192,084.
(Continued)

(51) Int. Cl.
B01J 19/00 (2006.01)
B01F 33/30 (2022.01)
(Continued)

(52) U.S. Cl.
CPC ....... B01J 19/0093 (2013.01); B01F 25/4231 (2022.01); B01F 33/30 (2022.01);
(Continued)

(58) Field of Classification Search
CPC .......... B01J 19/0093; B01J 2219/00813; B01J 2219/00889; B01J 2219/00891;
(Continued)

(56) References Cited

U.S. PATENT DOCUMENTS 3,648,984 A 3/1972 Mimura et al.
3,927,868 A 12/1975 Moore
(Continued)

FOREIGN PATENT DOCUMENTS

CN 101873890 A 10/2010
CN 102188943 A 9/2011
(Continued)

OTHER PUBLICATIONS

Afzal et al; "Convergent-Divergent Micromixer Coupled With Pulsatile Flow"; Sensors and Actuators B; 211 pp. 198205 (2015).
(Continued)

Primary Examiner — Huy Tram Nguyen
(74) Attorney, Agent, or Firm — Daniel J. Greenhalgh

(57) ABSTRACT

A flow reactor has a module having a process fluid passage with an interior surface, a portion of the passage including a cross section along the portion having a cross-sectional shape, and a cross-sectional area with multiple minima along the passage. The cross-sectional shape varies continually along the portion and the interior surface of the portion includes either no pairs of opposing flat parallel sides or only pairs of opposing flat parallel sides which extend for a length of no more than 4 times a distance between said opposing flat parallel sides along the portion and the portion contains a plurality of obstacles distributed along the portion.

20 Claims, 17 Drawing Sheets

Related U.S. Application Data

(60) Provisional application No. 62/539,541, filed on Jul. 31, 2017.

(51) Int. Cl.
*B01F 25/421* (2022.01)
*B01F 101/00* (2022.01)

(52) U.S. Cl.
CPC ............... *B01F 2101/2204* (2022.01); *B01J 2219/00813* (2013.01); *B01J 2219/00889* (2013.01); *B01J 2219/00891* (2013.01)

(58) Field of Classification Search
CPC .... B01J 2219/00792; B01J 2219/00795; B01J 2219/0081; B01J 2219/00855; B01F 25/4231; B01F 33/30; B01F 2101/2204; B01F 25/25
USPC ....................................................... 422/224
See application file for complete search history.

(56) References Cited

U.S. PATENT DOCUMENTS

| | | | |
|---|---|---|---|
| 4,087,862 | A | 5/1978 | Tsien |
| 7,510,688 | B2 | 3/2009 | Choe et al. |
| 7,753,580 | B2 | 7/2010 | Woehl et al. |
| 7,794,136 | B2 | 9/2010 | Yang et al. |
| 7,846,398 | B2 | 12/2010 | Lee et al. |
| 7,850,930 | B2 | 12/2010 | Miyamoto et al. |
| 7,939,033 | B2 | 5/2011 | Lavric et al. |
| 8,061,416 | B2 | 11/2011 | Geskes et al. |
| 8,088,345 | B2 | 1/2012 | Caro et al. |
| 8,206,666 | B2 | 6/2012 | Wang et al. |
| 8,430,558 | B1 | 4/2013 | Yakhshi et al. |
| 8,434,933 | B2 | 5/2013 | Brito et al. |
| 8,534,909 | B2 | 9/2013 | Guidat et al. |
| 8,591,841 | B2 | 11/2013 | Asano et al. |
| 9,023,296 | B2 | 5/2015 | Roberge et al. |
| 9,073,031 | B2 | 7/2015 | Hoglund et al. |
| 9,101,903 | B2 | 8/2015 | Zikeli et al. |
| 11,192,084 | B2 * | 12/2021 | Jean ................. B01F 25/4231 |
| 2003/0219903 | A1 | 11/2003 | Wang et al. |
| 2004/0100864 | A1 | 5/2004 | Schauerte |
| 2004/0228211 | A1 | 11/2004 | Koripella et al. |
| 2005/0078553 | A1 | 4/2005 | Wilken |
| 2005/0211242 | A9 | 9/2005 | Plath |
| 2006/0101775 | A1 | 5/2006 | Miyake et al. |
| 2007/0081923 | A1 | 4/2007 | Choe et al. |
| 2009/0323463 | A1 | 12/2009 | Bhopte et al. |
| 2010/0052152 | A1 | 3/2010 | Choi |
| 2011/0150703 | A1 | 6/2011 | Castro et al. |
| 2012/0052558 | A1 | 3/2012 | Chivilikhin et al. |
| 2012/0076705 | A1 | 3/2012 | Kockmann |
| 2012/0171090 | A1 | 7/2012 | Chang |
| 2013/0021868 | A1 | 1/2013 | Doolin et al. |
| 2014/0104975 | A1 | 4/2014 | Chivilikhin |
| 2014/0255265 | A1 | 9/2014 | Kulkarni et al. |
| 2014/0290786 | A1 | 10/2014 | Ito et al. |

FOREIGN PATENT DOCUMENTS

| | | |
|---|---|---|
| CN | 102188944 A | 9/2011 |
| CN | 102240535 A | 11/2011 |
| CN | 102247787 A | 11/2011 |
| CN | 202096947 U | 1/2012 |
| CN | 102350286 A | 2/2012 |
| CN | 202169168 U | 3/2012 |
| CN | 202191898 U | 4/2012 |
| CN | 202191899 U | 4/2012 |
| CN | 202191902 U | 4/2012 |
| CN | 102448596 A | 5/2012 |
| CN | 102553482 A | 7/2012 |
| CN | 202527089 U | 11/2012 |
| CN | 103285798 A | 9/2013 |
| CN | 103638853 A | 3/2014 |
| CN | 203525623 U | 4/2014 |
| CN | 103877905 A | 6/2014 |
| CN | 104069767 A | 10/2014 |
| CN | 104138728 A | 11/2014 |
| CN | 104307413 A | 1/2015 |
| CN | 204193922 U | 3/2015 |
| CN | 104525031 A | 4/2015 |
| CN | 204338128 U | 5/2015 |
| CN | 104737025 A | 6/2015 |
| CN | 204429262 U | 7/2015 |
| CN | 105822400 A | 8/2016 |
| CN | 109863501 A | 6/2019 |
| EP | 2172260 A1 | 4/2010 |
| EP | 2431090 A1 | 3/2012 |
| GB | 2475401 A | 5/2011 |
| JP | S52-011221 B1 | 3/1977 |
| JP | S52-151676 A | 12/1977 |
| JP | S63-104679 A | 5/1988 |
| JP | 2004-024992 A | 1/2004 |
| JP | 2004-294417 A | 10/2004 |
| JP | 2006-053091 A | 2/2006 |
| JP | 2006-122736 A | 5/2006 |
| JP | 2007-136322 A | 6/2007 |
| JP | 2007-190505 A | 8/2007 |
| JP | 2008-114162 A | 5/2008 |
| JP | 2009-082803 A | 4/2009 |
| JP | 2009-090248 A | 4/2009 |
| JP | 2009-233483 A | 10/2009 |
| JP | 4598646 B2 | 12/2010 |
| JP | 2011-020044 A | 2/2011 |
| JP | 2011-036773 A | 2/2011 |
| JP | 2011-508657 A | 3/2011 |
| JP | 4677969 B2 | 4/2011 |
| JP | 4855471 B2 | 1/2012 |
| JP | 4877211 B2 | 2/2012 |
| JP | 4892183 B2 | 3/2012 |
| JP | 2012-508643 A | 4/2012 |
| JP | 2014-198324 A | 10/2014 |
| KR | 10-0898065 B1 | 5/2009 |
| KR | 10-0934267 B1 | 12/2009 |
| KR | 10-1176175 B1 | 5/2013 |
| KR | 10-2014-0082377 A | 7/2014 |
| TW | 200940162 A | 10/2009 |
| TW | 200946914 A | 11/2009 |
| TW | 201302299 A | 1/2013 |
| WO | 2010/009239 A2 | 1/2010 |
| WO | 2010/037012 A2 | 4/2010 |
| WO | 2010/120234 A1 | 10/2010 |
| WO | 2010/130808 A2 | 11/2010 |
| WO | 2010/130811 A2 | 11/2010 |
| WO | 2010/131297 A1 | 11/2010 |
| WO | 2010/138676 A1 | 12/2010 |
| WO | 2012/062567 A1 | 5/2012 |
| WO | 2012/166756 A1 | 12/2012 |
| WO | 2013/054180 A1 | 4/2013 |
| WO | 2015/137691 A1 | 9/2015 |

OTHER PUBLICATIONS

Afzal et al; "Passive Split and Recombination Micromixer With Convergent-Divergent Walls"; Chemical Engineering Journal; 203; pp. 182192; (2012).

Ansari et al; "A Novel Passive Micromixer Based on Unbalanced Splits and Collisions of Fluid Streams"; Journal of Micromechanics and Microengineering; 20 (5), 055007; 10 Pages (2010).

Ansari et al; "A Numerical Study of Mixing in a Microchannel With Circular Mixing Chanbers"; A.I.Ch.E JOURNAL 55 (9), pp. 2217-2225 (2009).

Ansari et al; "Parametric Study on Mixing of Two Fluids in a Three-Dimensional Serpentine Microchannel"; Chemical Engineering Journal 146, pp. 439448, (2009).

Ansari et al; "Shape Optimization of a Micromixer With Staggered Herringbone Groove" Chem Eng Sci. 62, pp. 6687-6695; (2007).

Aubin et al; "Characterization of the Mixing Quality in Micromixers"; Chem Eng Technol 26, pp. 12621270 (2003).

(56) References Cited

OTHER PUBLICATIONS

Bhopte et al; "Numerical Study of a Novel Passive Micromixer Design"; http://ieeexplore.ieee.org/stamp/slamp.jsp?arnumber=05501318, 10 Pages (2010).

Boskovic et al; "Modelling of the Residence Time Distribution in Micromixers"; Chemical Engineering Journal 135S, pp. S138S146 (2008).

Chang et al; "Turbulent Heat Transfer and Pressure Drop in Tube Fitted With Serrated Twisted Tape"; International Journal of Thermal Sciences 46 (5), pp. 506-518 (2007).

Chen et al; "Crosswise Ridge Micromixers With Split and Recombination Helical Flows" Chem. Eng. Sci. 66, pp. 2164-2176 (2011).

Chen et al; "Topologic Mixing on a Microfluidic Chip"; Appl Phys Lett. 84 (12), pp. 21932195 K2004).

Chinese Patent Application No. 201880050026.3, Office Action dated Jul. 21, 2021, 5 pages (English Translation Only), Chinese Patent Office.

Chung et al; "A Rhombic Micromixer With Asymmetrical Flow for Enhancing Mixing"; J. Micromech. Microeng. 17, pp. 24952504 (2007).

Chung et al; "Design and Mixing Efficiency of Rhombic Micromixer With Flat Angles" Microsyst Technol 16, pp. 1595-1600 (2010).

Chung et al; "Mixing Process of an Obstacle Micromixer With Low Pressure Drop" Proceedings of the 3rd IEE Int. Conf. on Nano/Micro Engineered and Molecular System, J008, China, pp. 170-173.

Cortes-Quiroz et al; "On Multi-Objective Optimization of Geometry of Staggered Herringbone Micromixer"; Microfluidics and Nanofluidics 7(1), pp. 29-43 (2009).

Du et al; "A Simplified Design of the Staggered Herringbone Micromixer for Practical Applications"; Biomicrofluidics 4(2), pp. 024105-1-024105-13 (2010).

Du et al; "Evaluation of Floor-Grooved Micromixers Using Concentration-Channel Length Profiles"; Micromachines 1, pp. 19-33, (2010).

Eiamsa-Ard et al; "Experimental Investigation of Heat Transfer and Flow Friction in a Circular Tube Fitted With Regularly Spaced Twisted Tape Elements"; International Communications in Heat and Mass Transfer;33(10), pp. 1225-1233 (2006).

Fang et al; "A Novel Microreactor With 3D Rotating Flow to Boost Fluid Reaction and Mixing of Viscous Fluids"; Sensors and Actuators B 140, pp. 629642 (2009).

Fang et al; "Mixing Enhancement by Simple Periodic Geometric Features in Microchannels" Chemical Engineering Journal 187, pp. 306 310 (2012).

Garofalo et al; "Spectral Characterization of Static Mixers. The S-Shaped Micromixeras a Case Study"; AIChE Journal 56(2), pp. 3187-3335 (2010).

Gentry, C.C, "ROD baffle heat exchanger technology", Chemical Engineering Progress 86 (7),(Jul. 1, 1990), pp. 48-56.

Guzman et al; "Transition to Chaos in Converging-Diverging Channel Flows: Ruelle-Takens-Newhouse Scenario"; Phys. Fluids 6(6), pp. 1994-2002 (1993).

Hessel et al; "Micromixersa Review on Passive and Active Mixing Principles"; Chemical Engineering Science 60, pp. 2479 2501 (2005).

Holvay et al; "Pressure Drop and Miixng in Single Phase Microreactors: Simplified Designs of Mixers"; Chemical Engineering and Processing: Process Intensification 50(10), pp. 1069-1075 (2011).

Hong et al; "A Novel In-Plane Passive Microfluidic Mixer With Modified Tesla Structures" AB Chip 4, pp. 109113. (2004).

Hossainn et al; "Shape Optimization of a Micromixer With Staggered Herringbone Grooves on Top and Bottom Walls"; Engineering Applications of Computational Fluid Mechanics 5(4) pp. 506-516 (2011).

Hsieh et al; "Passive Mixing in Micro-Channels With Geometric Variations Through PIV and LIF Measurements"; J_Micromech. Microeng. 18 065017; 11 Pages (2008) doi:10.1088/0960-1317/18/6/065017.

International Search Report and Written Opinion of the International Searching Authority; PCT/US2018/044572; dated Oct. 11, 2018; 12 Pages; European Patent Office.

Jeon et al; "Design and Characterization of a Passive Recycle Micromixer"; J. Micromech. Microeng. 15, pp. 346350 (2005).

Jiang et al; "Helical Flows and Chaotic Mixing in Curved Micro Channels"; AIChE Journal 50(9), pp. 2297-2305 (2004).

Kang et al; "A Chaotic Serpentine Mixer Efficient in the Creeping Flow Regime: From Design Concept to Optimization"; Microfluid Nanofluid; 7; pp. 783-794 {2009)DOI 10.1007/s10404-009-0437-2.

Kang et al; "Colored Particle Tracking Method for Mixing Analysis of Chaotic Micromixers"; J Micromech Microeng. 14, pp. 891899 (2004).

Kim et al; "A Serpentine Laminating Micromixing Combining Splitting/Recombination and Advection"; Lab on a Chip; 5, pp. 739-747 (2005).

Kim et al; "Optimization of Microscale Vortex Generators in a Microchannel Using Advanced Response Surface Method"; International Journal of Heat and Mass Transfer 54 1-3), pp. 118-125 (2011).

Ko; "Thermodynamic Analysis of Optimal Mass Flow Rate for Fully Developed Laminar Forced Convection in a Helical Coiled Tube Based on Minimal Entropy Generation Principle"; Energy Conversion and Management47{18-19),pp. 3094-3104 (2006).

Kolbl et al; "Design Parameter Studies on Cyclone Type Mixers"; Chemical Engineering Journal 167, pp. 444454, (2011).

Kumar et al; "Single-Phase Fluid Flow and Mixing Microchannels"; Chem. Eng. Sci. 66, pp. 1329-1373(2011).

Lasbet et al; "Thermal and Hydrodynamic Performances of Chaotic Mini-Channel: Application to the Fuel Cell Cooling"; Heat Transfer Engineering 28(8-9), pp. 795-803 (2007).

Lee et al; "Mixing Efficiency of a Multi Lamination Micromixer With Consecutive Recirculation Zones"; Chem. Eng. Sci. 64 (6), pp. 1223-1231 (2009).

Lee et al; "Mixing in Tangentially Crossing Microchannels"; AIChE Journal 57(3), pp. 571-580 (2011).

Lee et al; "On the Enhancement of Mixing in Tangentially Crossing Micro-Channels" Chemical Engineering Journal 181 182, pp. 524 529, (2012).

Lee et al; "Rotation Effect in Split and Recombination Micromixing"; Sensorsand Actuators B 129, pp. 364-371 (2008).

Li et al; "Improving Mixing Efficiency of a Polymer Micromixer by Use of a Plastic Shim Divider"; J. Micromech. Microeng. 20, 9 Pages; (2010) doi: 10.1088/0960-1317/20/3/035012.

Lin; "Numerical Characterization of Simple Three-Dimensional Chaotic Micromixers" Chemical Engineering Journal; 277; pp. 303311 (2015).

Liu et al; "Passive Mixing in a Three-Dimensional Serpentine Microchannel"; J_Microelectromech. Syst. 9(2), pp. 190197; (2000).

Lu et al; "Passive Microfluidic Device for Submillisecond Mixing"; Sens Actuators B Chem. 144(1), pp. 301309; (2010).

MacInnes et al.; "Numerical Characterisation of Folding Flow Microchannel Mixers"; Chem. Eng. Sci. 62, pp. 2178-2727; (2007).

Malecha et al; "Serpentine Microfluidic Mixer Made in LTCC"; Sensors and Actuators B 143, pp. 400413 (2009).

Mansur et al; "A State-of-the-Art Review of Mixing in Microfluidic Mixers"; Chinese Journal of Chemical Engineering, 16 (4) pp. 503-516 (2008).

Mengeaud et al; "Mixing Processes in a Zigzag Microchannel: Finite Element Simulations and Optical Study"; Anal. Chem. 74(16), pp. 42794286 (2002).

Mielke et al; "Microreactor Mixing-Unit Design for Fast Liquid-Liquid Reactions"; J. Flow Chem. 6(3) pp. 279-287 (2016).

Miranda et al; "Numerical Study of Micromixing Combining Alternate Flow and Obstacles" Int. Comm. in Heat and Mass Transfer 37, pp. 581-586 (2010).

Mouza et al; "Mixing Performance of a Chaotic Micro-Mixer"; Chemical Engineering Research and Design 86, pp. 11281134 (2008).

Naphon et al; "A Review of Flow and Heat Transfer Characteristics in Curved Tubes" Renewable and Sustainable Energy Reviews 10(5), pp. 463-490 (2006).

(56) References Cited

OTHER PUBLICATIONS

Naphon et al; "Effect of Curvature Ratios on the Heat Transfer and Flow Developments in the Horizontal Spirally Coiled Tubes"; International Journal of Heat and Mass Transfer50(34), pp. 444-451 (2007).
Naphon; "Heat Transfer and Pressure Drop in the Horizontal Double Pipes With and Without Twisted Tape Insert"; International Communications in Heat and Mass Transfer 33(2), pp. 166-175 (2006).
Nguyen et al; "Micromixersa Review"; J Micromech Microeng. 15, pp. R1R16 (2005).
Nguyen; "Micromixers: Fundamentals, Design, and Fabrication"; William Andres, Chapters 1,2 5 and 6; 184 Total Pages (2008); ISBN 0815518366.
Nieves-Remacha et al; "Gas-Liquid Flow and Mass Transfer in an Advanced-Flow Reactor" Ind. & Eng. Chem. Res. 52, pp. 8996 9010 (2013).
Nieves-Remacha et al; "Hydrodynamics of Liquid-Liquid Dispersion in an Advanced-Flow Reactor"; Ind. & Eng. Chem. Res. 51, pp. 16251 16262 (2012).
Ohkawa et al; "Flow and Mixing Characteristics of s-Type Plate Static Mixer With Splitting and Inverse Recombination"; Chemical Engineering Research and Design 86, pp. 14471453 2008.
Park et al; "Improved Serpentine Laminating Micromixer With Enhanced Local Advection" Microfluid Nanofluid 4, pp. 513-523 (2008).
Park et al; "Numerical Characterization of Three-Dimensional Serpentine Micromixers"; A.I.Ch.E. Journal 54 (8), pp. 19992008. (2008).
Plouffe et al; "Liquid-Liquid Flow Regimes and Mass Transfer in Various Micro-Reactors" Chemical Engineering Journal; 10 Pages (2015).
Plouffe et al; "On the Scale-Up of Micro-Reactors for Liquid-Liquid Reactors"; Chemical Engineering Science; 143; pp. 216-225 (2016).
Rosaguit et al; "Laminar Flow and Heat Transfer in a Periodic Serpentine Channel With Semi-Circular Cross-Section"; International Journal of Heat and Mass Transfer, 49(17-18), pp. 2912-2923, (2006).
Rosaguti et al; "Low-Reynolds Number Heat Transfer Enhancement in Sinusoidal Channels"; Chemical Engineering Science 62(3),pp. 694-702 (2007).
Rush et al; "An Experimental Study of Flow and Heat Transfer in Sinusoidal Wavy Passages"; Int. J. Heat Mass Transfer; 42, pp. 1541-1553; (1997).
Schonfeld et al; "An Optimised Split-and-Recombine Micro-Mixer With Uniform Chaotic Mixing"; Lab on a Chip 4, pp. 6569 (2004).
Schonfeld et al; "Simulation of Helical Flows in Microchannels"; A.I.Ch. E. Journal 50, pp. 771-778 (2004).

Sharma et al; "3D Flow Reactors: Flow, Hydrodynamics, and Performance"; Ind. Eng. Chem. Res.; 53; pp. 1916-1923 (2014).
Sivashanmugam et al; "Experimental Studies on Heat Transfer and Friction Factor Characteristics of Turbulent Flow Through a Circular Tube Fitted With Helical Screwtape Inserts"; Applied Thermal Engineering 26 (16), pp. 1190-1997 (2007).
Song et al; "Optimization Analysis of the Staggered Herringbone Micromixer Based on the Slip-Driven Method"; Chemical Engineering Research and Design 86(8), pp. 883-891; (2008).
Stankiewics et al; "Process Intensification: Transforming Chemical Engineering"; Chemical Engineering Progress 96 (1), pp. 22-34 (2000).
Stankiewicz; Can Microreactor Be Intensified? Alternatice Forms and Sources of Energy for Process Intensification; IMRET 9, 5 Pages; (2006).
Stroock et al; "Chaotic Mixer for Microchannels"; Science 295, pp. 647651 (2002).
Tafti et al; "Effect of Laminar Velocity Profile Variation on Mixing in Mircofluidic Devices: The Sigma Micromixer"; Applied Physics Letters 93, pp. 143504-1-143054-3; (2008).
Vashisth et al;"A Review of the Potential Applications of Curved Geometries in Process Industries"; Ind. Eng. Chem. Res. 47, pp. 3291-3337 (2008).
Vijayendran et al; "Evaluation of a Three-Dimensional Micromixer in a Surface-Based Biosensor"; Langmuir 19, pp. 18241828 (2003).
Vikhansky et al; "Analysis of a Pressure-Driven Folding Flow Microreactor With Nearly Plug-Flow Characteristics"; A.I.Ch. E Journal 56 (8), pp. 1988-1994 (2009).
Wu et al; "Fluid Mixing via Multidirectional Vortices in Converging-Diverging Meandering Microchannels With Semi-Elliptical Side Walls"; Chemical Engineering Journal 217, pp. 320328; (2013).
Xia et al; "Chaotic Micromixers Using Two-Layer Crossing Channels to Exhibit Fast Mixing A" Low Reynolds Numbers"; Lab on a Chip; 5, pp. 748755 (2005).
Xia et al; "Influence of the Reynolds Number on Chaotic Mixing in a Spatially Periodic Micromixer and Its Characterization Using Dynamical System Techniques"; Micromech Microeng; 16, pp. 5361 (2006).
Xu et al; "Countercurrent Droplet-Flow-Based Mini Extraction With Pulsed Feeding and Without Moving Parts"; AICHE Journal; vol. 62, No. 10 pp. 3685-3698 (2016).
Yang et al; "A High-Performance Micromixer Using Three-Dimensional Tesla Structures for Bio-Applications"; Chemical Engineering Journal 263; pp. 444451 (2015).
Yang et al; "Geometric Effects on Fluid Mixing in Passive Grooved Micromixers"; Lab on a Chip 5, pp. 1140-1147 (2005).
Japanese Patent Application No. 2020-505369, Office Action, dated Mar. 30, 2022, 08 pages (04 pages of English Translation and 04 pages of Original Copy); Japanese Patent Office.

* cited by examiner 20, 30

52

20, 30

52, 70, 50

PROCESS-INTENSIFIED FLOW REACTOR

CROSS-REFERENCE TO RELATED APPLICATIONS

This application is a continuation of U.S. application Ser. No. 16/635,069, filed on Jan. 29, 2020, which claims the benefit of priority under 35 U.S.C. § 371 of International Application No. PCT/US2018/044572, filed on Jul. 31, 2018, which claims the benefit of priority under 35 U.S.C. § 119 of U.S. Provisional Application No. 62/539,541, filed Jul. 31, 2017, the content of each of which is incorporated herein by reference in their entirety.

FIELD

The present disclosure relates generally to flow reactors and particularly to flow reactors having optimized channel structures.

BACKGROUND

Process intensification aims to produce highly efficient reaction and processing systems using configurations that simultaneously significantly reduce reactor sizes and maximize mass- and heat-transfer efficiencies. Interest in and application of process intensification in chemical engineering is continually increasing because of the potential to transform large-scale, environmentally unfriendly industrial processes into smaller, safer, more energy-efficient and environmentally friendly processes.

Process intensification consists in the development of novel apparatuses and techniques that, compared to those commonly used today, are expected to bring very significant, even order(s)-of-magnitude improvements in manufacturing and processing, in decreasing equipment-size/production-capacity ratio, energy consumption, and/or waste production, ultimately resulting in cheaper and sustainable technologies. Put another way, any chemical engineering development that leads to a substantially smaller, cleaner, and more energy-efficient technology is process intensification.

The whole field of process intensification can generally be divided into two areas: process-intensifying equipment, such as novel reactors and intensive mixing, heat-transfer and mass-transfer devices; and process-intensifying methods, such as new or hybrid separations, integration of reaction and separation, heat exchange, or phase transition (in so-called multifunctional reactors), techniques using alternative energy sources (light, ultrasound, etc.), and new process-control methods (like intentional unsteady-state operation). Obviously, there can be some overlap. New methods may require novel types of equipment to be developed and vice versa, while novel apparatuses already developed sometimes make use of new, unconventional processing methods.

In U.S. Pat. No. 7,939,033 is disclosed a "microreactor" or micro- to milli-meter scale flow reactor with a characteristic channel design producing good mixing performance relative to pressure drop in a given channel or device. It would be desirable to achieve even better performance, however, such as equal or better mixing with lower pressure drop.

SUMMARY

The following presents a simplified summary of the disclosure in order to provide a basic understanding of some exemplary embodiments described in the detailed description.

In some embodiments, a flow reactor has a module having a process fluid passage with an interior surface, a portion of the passage including a cross section along the portion having a cross-sectional shape, and a cross-sectional area with multiple minima along the passage. The cross-sectional shape varies continually along the portion and the interior surface of the portion includes either no pairs of opposing flat parallel sides or only pairs of opposing flat parallel sides which extend for a length of no more than 4 times a distance between said opposing flat parallel sides along the portion and the portion contains a plurality of obstacles distributed along the portion.

In some embodiments, the portion further comprises successive chambers each with a nozzle-like entrance and a narrowing exit.

In some embodiments, a chamber of said successive chambers is nested with a next-succeeding chamber of said successive chambers such that the narrowing exit of the one chamber forms the nozzle-like entrance of the next adjacent succeeding chamber.

In some embodiments, at least one of the plurality of obstacles is located within a first chamber and intersects a straight line having a first endpoint located at a center of the entrance of the first chamber and a second endpoint locate at a center of the exit of the first chamber.

In some embodiments, the at least one of the plurality of obstacles intersects every straight line having a first end point within the entrance of the first chamber and a second endpoint within the exit of the first chamber.

In some embodiments, the reactor having an obstacles in the first chamber has one or more bypass paths positioned between the at least one obstacle and an inside surface of the first chamber, i.e., around the at least one obstacle of the plurality of obstacles.

In some embodiments, the at least one obstacle has no openings extending through said at least one obstacle.

In some embodiments, with two or more bypass paths around the obstacle, the bypass paths are separated by the obstacle by a distance of at least twice a maximum diameter of the exit of the chamber, or as much as at least 2.5, 3, 3.5, or even 4 times.

In some embodiments, the flow reactor further comprises an internal screw thread structure on an inner surface of the portion of the process fluid passage.

The above embodiments are exemplary and can be provided alone or in any combination with any one or more embodiments provided herein without departing from the scope of the disclosure. Moreover, it is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description, serve to explain the principles and operations thereof.

BRIEF DESCRIPTION OF THE DRAWINGS

These and other features, embodiments, and advantages of the present disclosure can be further understood when read with reference to the accompanying drawings.

DETAILED DESCRIPTION

Figure 1:
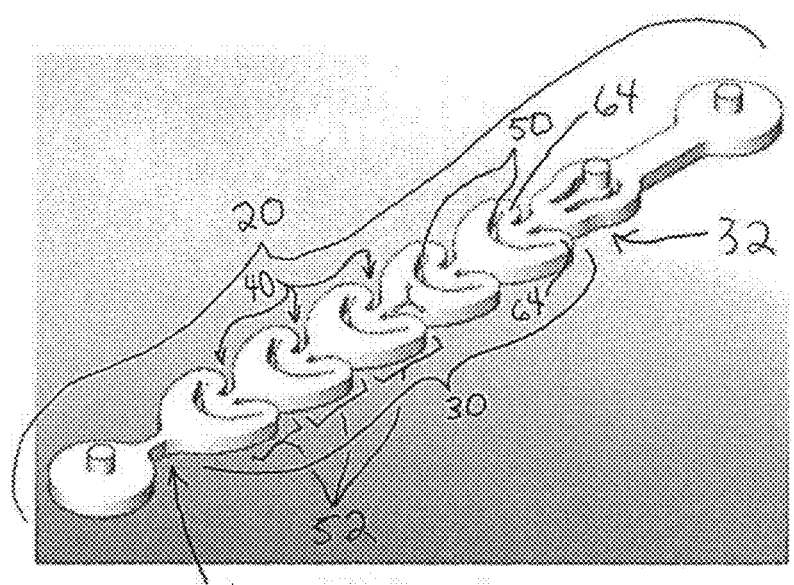
FIG. 1 (Prior Art) shows a three-dimensional perspective view of a portion of a process fluid passage according to a prior art flow reactor.

Methods and apparatus will now be described more fully hereinafter with reference to the accompanying drawings in which exemplary embodiments of the disclosure are shown. Whenever possible, the same reference numerals are used throughout the drawings to refer to the same or like parts. However, this disclosure can be embodied in many different forms and should not be construed as limited to the embodiments set forth herein.

The present disclosure relates generally to flow reactors employing modules similar to the ones disclosed in U.S. Pat. No. 7,939,033, hereby incorporated in its entirety by reference. If desired, the modules of the present disclosure may, however, depart from the generally planar geometry of that reference.

Flow modules having passages as disclosed herein may be formed by machining, molding, 3-D printing, and the like. Modules may be unitary (not able to be disassembled) or may consists of plates or other parts that are mechanically compressed or otherwise sealed together in a removable fashion.

Figure 2:
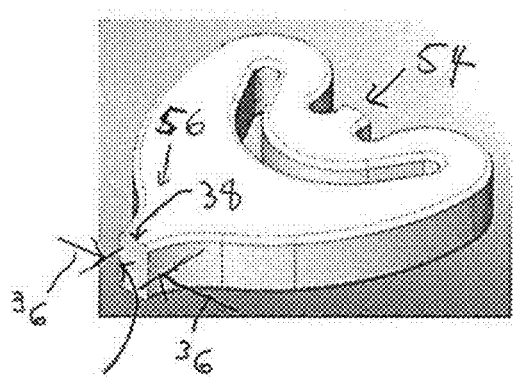
FIG. 2 (Prior Art) shows an individual chamber of the passage of FIG. 1.
Figure 3:
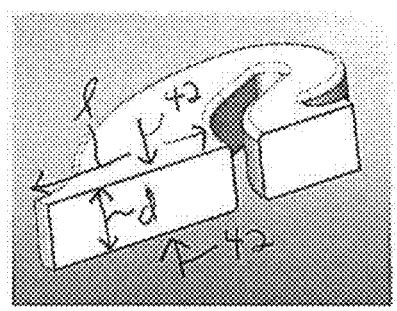
FIG. 3 (Prior Art) shows, in perspective view, a cross-section of the chamber of FIG. 2.

FIG. 1 (Prior Art) shows a three-dimensional perspective view of a portion of a process fluid passage according to a prior art flow reactor, while FIG. 2 (Prior Art) shows an individual chamber of the passage of FIG. 1, and FIG. 3 (Prior Art) shows, in perspective view, a cross-section of the chamber of FIG. 2.

With respect to FIGS. 1-3, a flow reactor of the general type disclosed herein comprises a module having a process fluid passage 20 therein, the process fluid passage comprising an interior surface 22, the process fluid passage 20 further comprising a portion 30 thereof, which portion further comprises an input end 32 at which process fluid is to flow into the portion 30 during use and an output end 34 at which process fluid is to flow out of the portion 30 during use.

The portion 20 also comprises a cross section 36 along the portion 30, delimited by the interior surface 22 of the passage 20 along the portion 30, the cross section 36 having a cross-sectional area and a cross-sectional shape 38, the cross-sectional area having multiple minima 40 along the passage 20 between the input end 32 and the output end 34.

Figure 4:
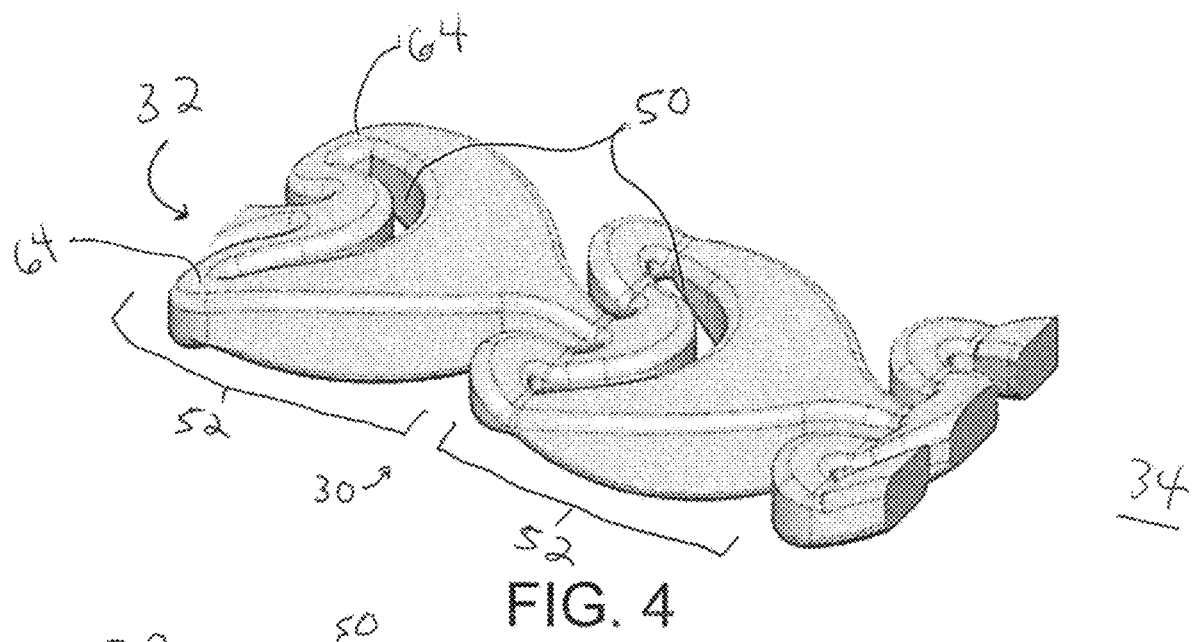
FIG. 4 shows a three-dimensional perspective view of a portion of a process fluid passage in accordance with embodiments of the present disclosure.
Figure 5:
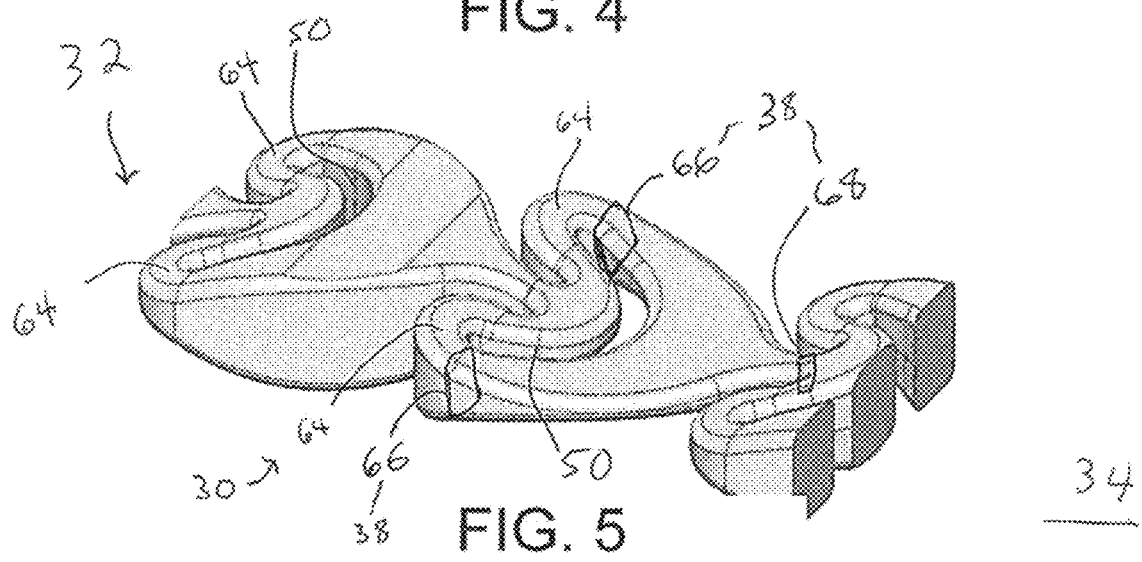
FIG. 5 shows a three-dimensional perspective view of a portion of a process fluid passage in accordance with embodiments of the present disclosure.
Figure 6:
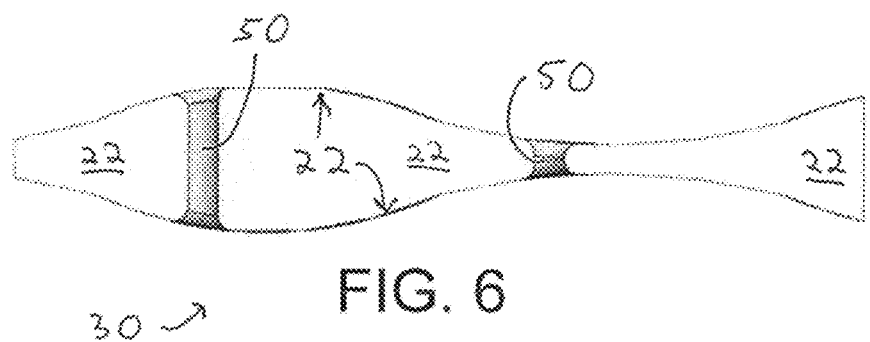
FIG. 6 shows a cross-sectional view of a the passage of FIG. 5.

FIGS. 4 and 5 each show a three-dimensional perspective view of a portion of a process fluid passage in accordance with embodiments of the present disclosure, and FIG. 6 shows a cross-sectional view of a the passage of FIG. 5. With respect to the passages shown in FIGS. 4-6, and generally with respect to embodiments of the present disclosure, the reactor is characterized in that the portion 30 of the passage 20 has (1) a cross-sectional shape 38 which varies continually along the portion 30, (2) an interior surface 22 (along the portion 30) which includes either no pairs of opposing flat parallel sides 42 (as seen in FIG. 3) or only pairs of opposing flat parallel sides 42 which extend for a length of no more than 4 times a distance d between said opposing flat parallel sides 42 along the portion 30 (shown in FIG. 12, discussed below), and (3) a plurality of obstacles 50 positioned along (within) the portion between the input end 32 and the output end 34 (in this case, in the form of a curved wall with a concave surface facing upstream.

Figure 7:
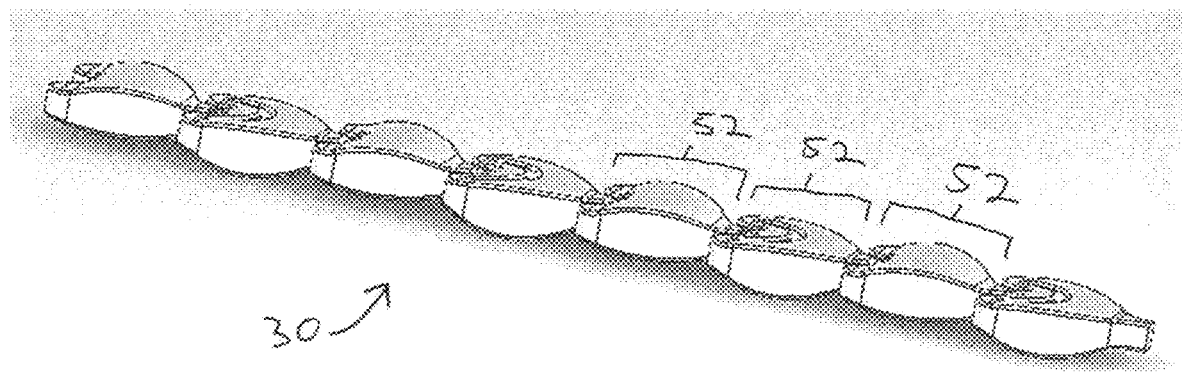
FIG. 7 shows a three-dimensional perspective view of a portion of a process fluid passage in accordance with embodiments of the present disclosure.
Figure 8:
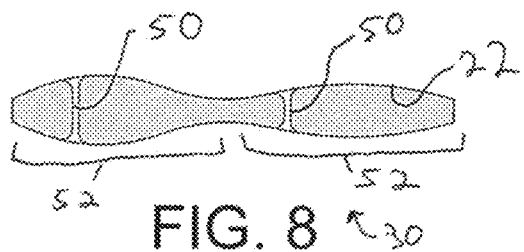
FIG. 8-10 each show a cross-sectional view of a portion of a process fluid passage in accordance with embodiments of the present disclosure.
Figure 9:
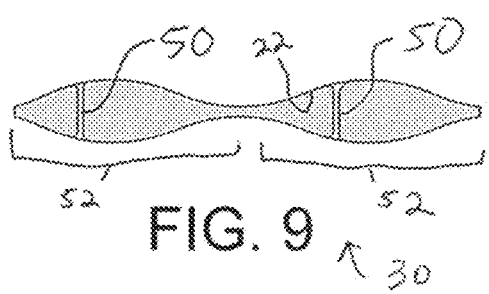
Figure 10:
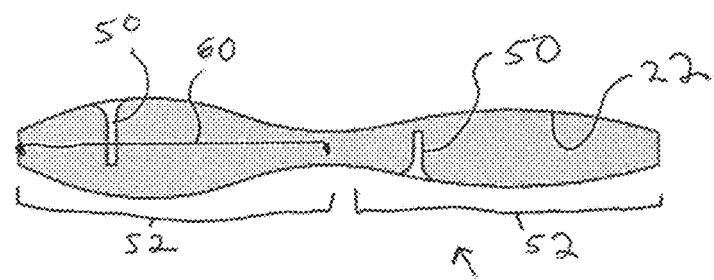

Various forms of curvature may be used for the interior surface 22 of the portion 30 of the passage 20. As seen in FIG. 4, the height of the portion 30 of the passage 20 may vary periodically with the chambers themselves, so that each successive chamber is essentially identical. Alternatively, a period of variation in the height of the portion 20 of the passage 20 may be shorter, in length along the portion 30, or longer, as in the embodiment of FIG. 5. This results in obstacles 50 having varying height, as shown in the cross section of FIG. 6. Cross sections of additional embodiments of portions 30 of passages 20 are shown in FIGS. 8-10, with obstacles 50 of varying heights in the successive chambers 52 of FIG. 8, or of the same height in the successive chambers 52 of FIG. 9. Obstacles 50 may also extend only partially across the height of the chambers 52, as shown in the embodiment of FIG. 10. (Such obstacles effectively have only a single bypass path, albeit with a complex shape and flow pattern.) Variation in the height of the portion 30 of the passage 20 may also be asymmetrical, or the curvature of the successive chambers 52 may be asymmetrical. In the embodiment of FIG. 7 and as seen in the figure, every other chamber 52 has a larger "bulge" (or a smaller radius of curvature) on the upper inside surface of the chamber (relative to the lower inside surface), while the remaining chambers 52 have a a larger "bulge" (or a smaller radius of curvature) on the lower insider surface (relative to the upper).

In the case as in the embodiment of FIG. 10 where the obstacle 50 extends only partially across the height of the chamber 52, a straight line 60 having a first endpoint located at a center of the entrance of the chamber 52 and a second endpoint locate at a center of the exit of the chamber is intersected by the obstacle 50. This insures that the less than full height obstacle is sufficiently tall to have a significant effect in displacing flow in the height direction. Desirably, the obstacle 50 intersects not just the line 60 from the center point of the entrance to the center point of the exit of the chamber 52, but every line segment originating within the entrance of the chamber and ending within the exit of the chamber. In other words, desirably, there is no "line-of-sight" from the entrance to the exit of the chamber 52 even in the case that the obstacle extends only partially across the height of the chamber.

Figure 21:
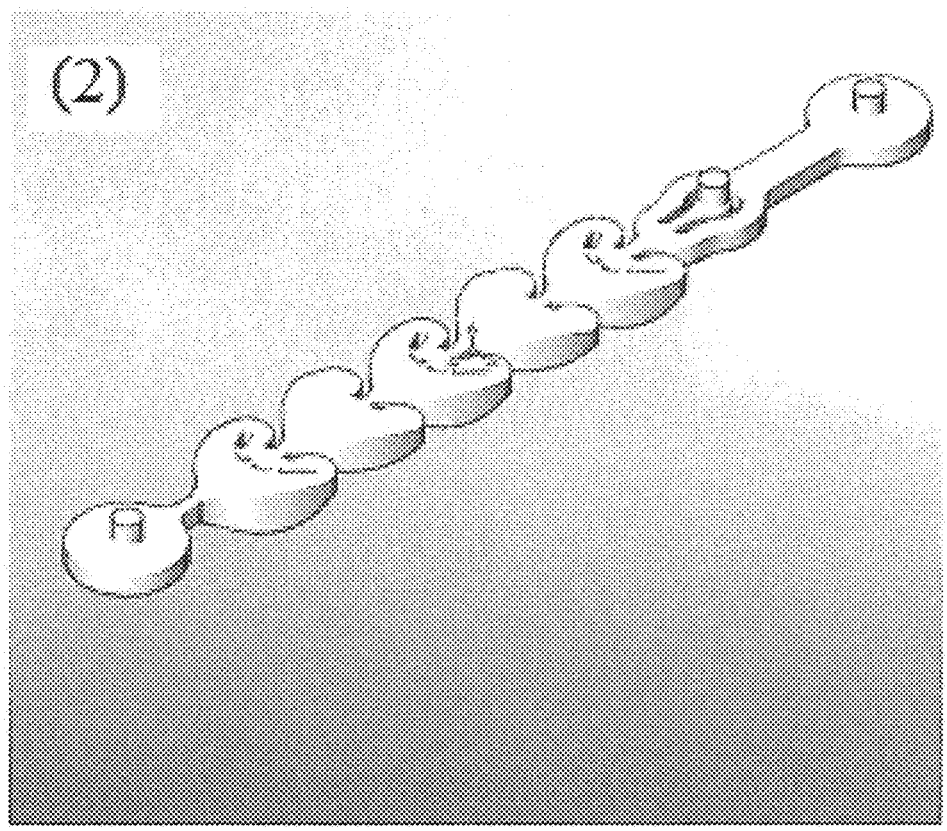
FIG. 21 shows a three-dimensional perspective view of a portion of a process fluid passage in accordance with embodiments of the present disclosure.
Figure 22:
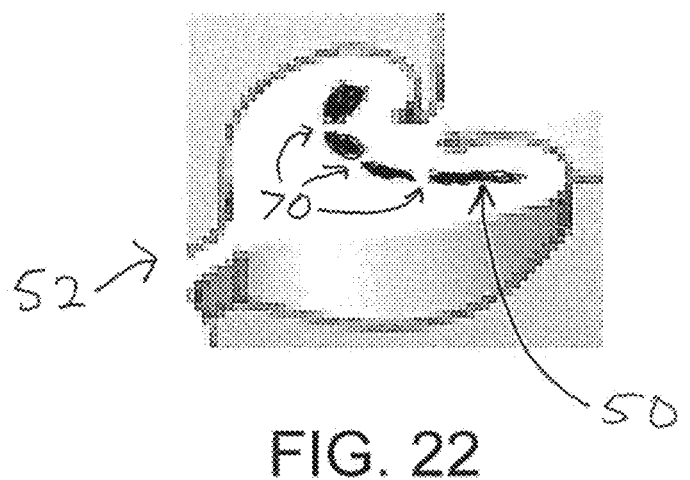
FIG. 22 shows an individual chamber of the passage of FIG. 21.
Figure 23:
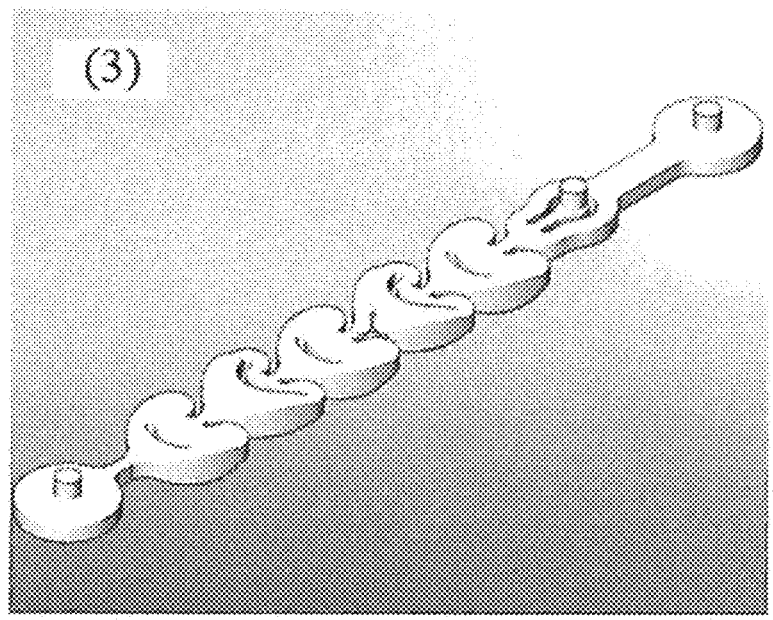
FIG. 23 shows a three-dimensional perspective view of a portion of a process fluid passage in accordance with embodiments of the present disclosure.
Figure 24:
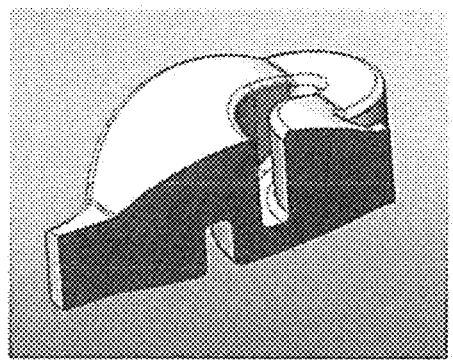
FIG. 24 shows a cross-sectional view of a chamber of the passage of FIG. 23.

The portions 30 of passages 20 herein include one or more bypass paths 64, as indicated, for example, in FIGS. 4 and 5. The bypass paths 64 are paths positioned between the obstacle 50 and an inside surface of the associated chamber 52, and which lead around the obstacle 50. Such bypass paths 64 are distinguished from openings extending through an obstacle 50. Such openings 70 are seen in the embodiment of FIGS. 21-22. In embodiments more generally as seen in most other figures herein, the obstacle 50 has no openings extending through the obstacle 50. According to embodiments, as shown in FIG. 4, the one or more bypass paths 64 have a total cross-sectional area 66 greater than the total cross-sectional area 68 of the exit of the associated chamber.

Figure 11:
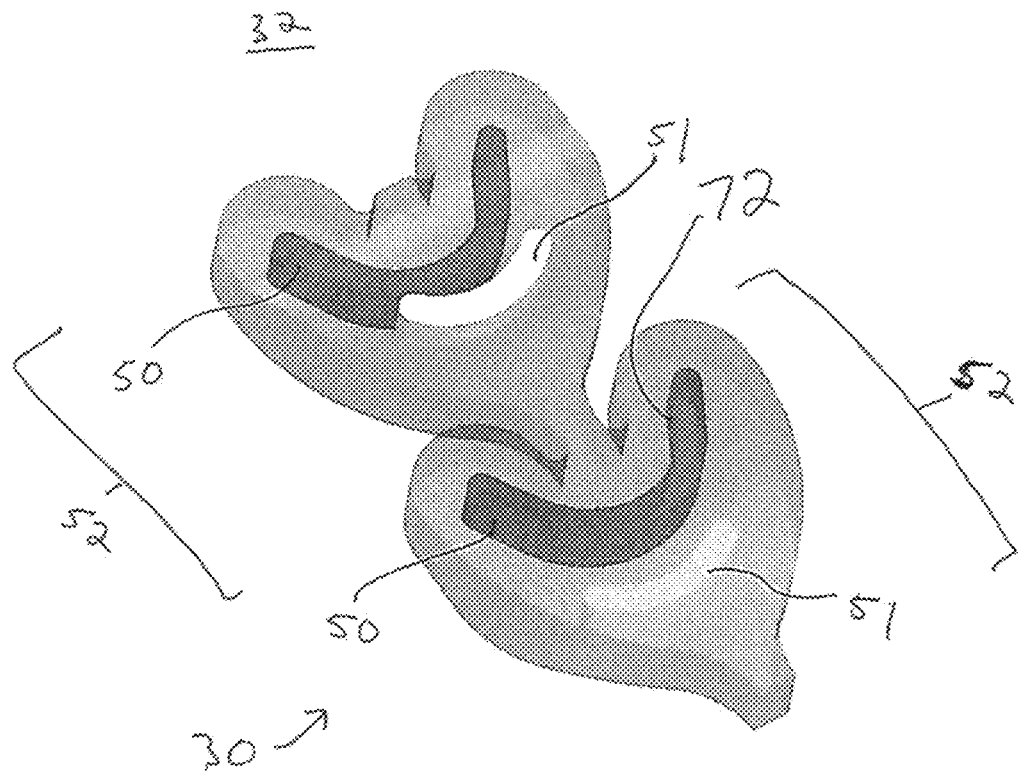
FIG. 11 shows a translucent perspective view of a portion of a process fluid passage in accordance with embodiments of the present disclosure.
Figure 12:
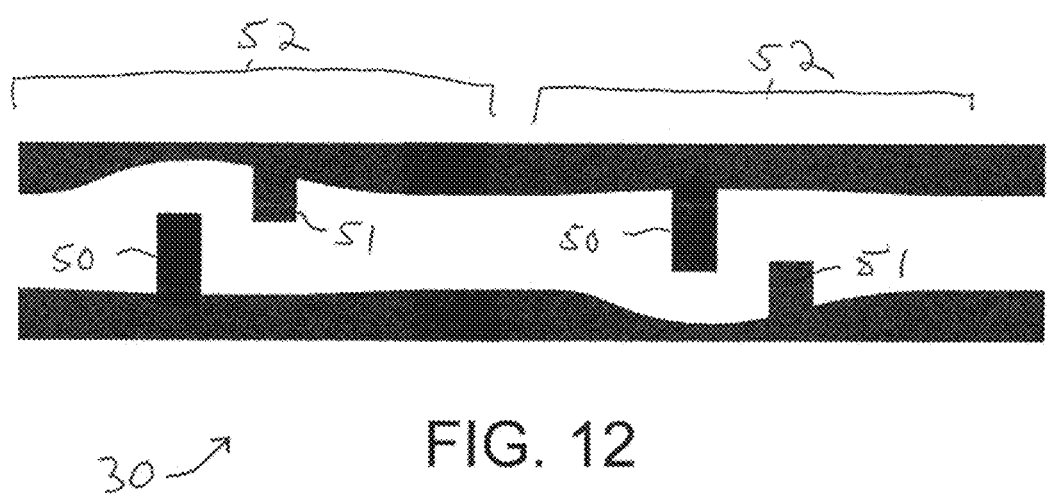
FIG. 12 shows a cross-sectional view of a portion of a process fluid passage in accordance with embodiments of the present disclosure, such as the embodiment of FIG. 11.
Figure 13:
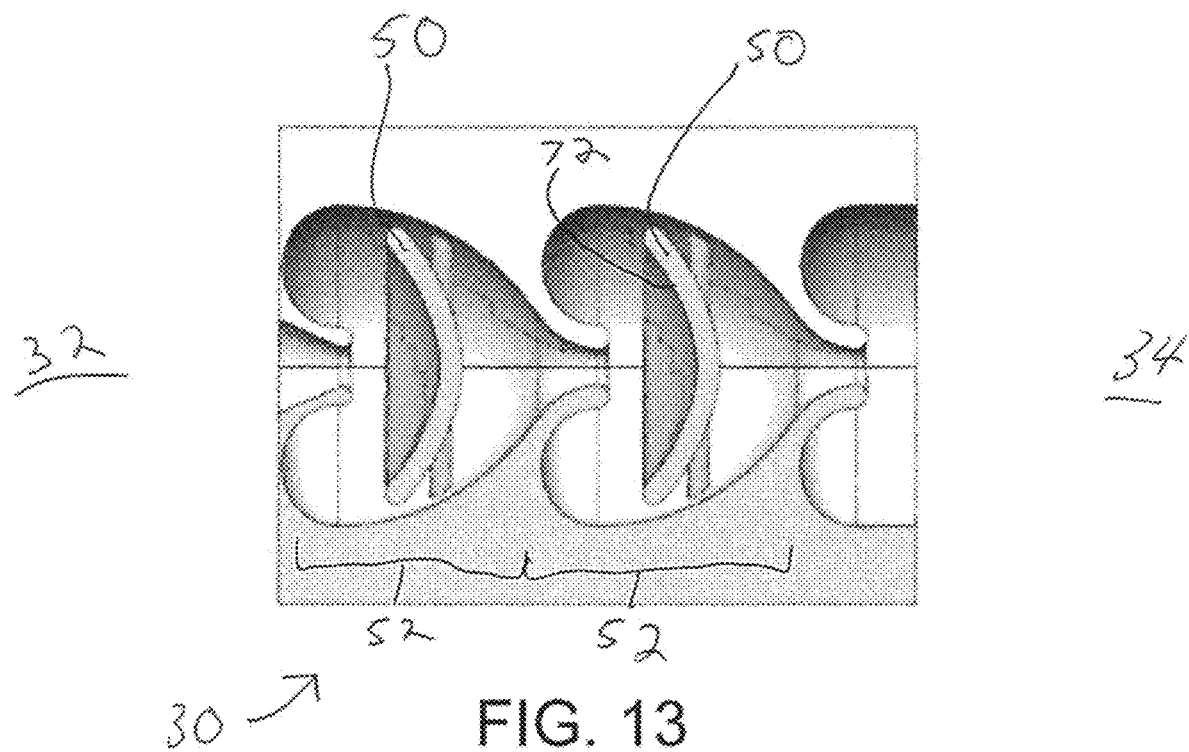
FIG. 13 shows a cut-away perspective view of a portion of a process fluid passage in accordance with embodiments of the present disclosure.
Figure 14:
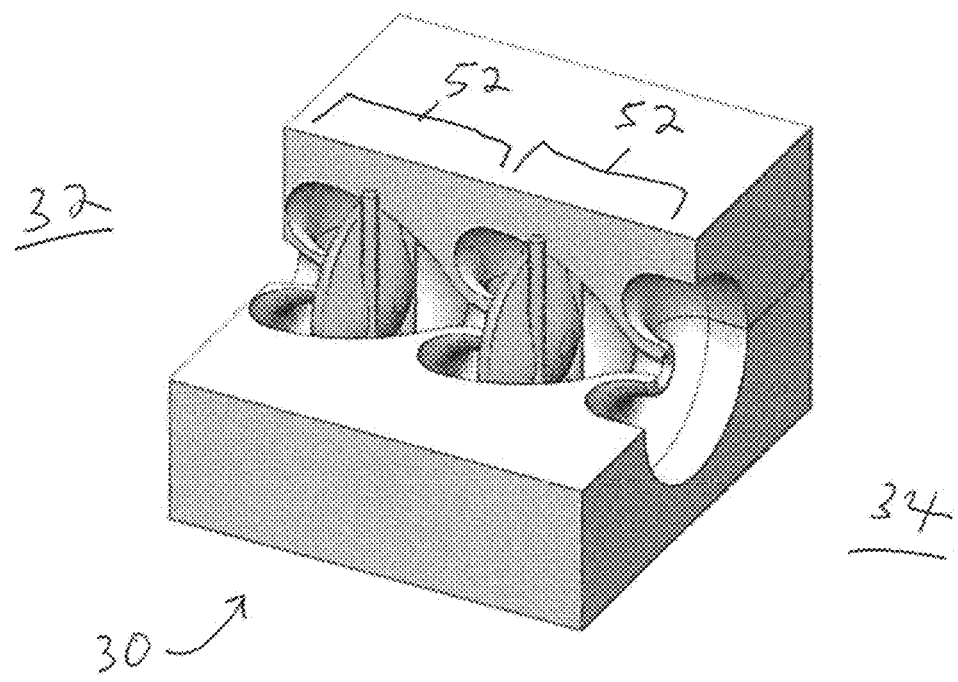
FIG. 14 shows an alternate cut-away perspective view of the portion of a process fluid passage in accordance with embodiments of the present disclosure of FIG. 13.

FIG. 11 shows a translucent perspective view of a portion of a process fluid passage in accordance with embodiments of the present disclosure while FIG. 12 shows a cross-sectional view of a portion of a process fluid passage in accordance with embodiments of the present disclosure, of the type of the embodiment of FIG. 11. In embodiments as shown here, one or more chambers 52 have both an obstacle 50 and a second obstacle 51 in the same chamber 52. Desirably, the obstacle 50 and second obstacle 52 extend only partially across the height of the chamber 52 (as seen most clearly in FIG. 12), and desirably they are attached alternately to the "floor" and "ceiling" of the chamber 52. In such embodiments, the obstacle or the second obstacle 52 may not, alone, intersect all lines of sight between the respective chamber's entrance and exit (or even the centerline between them), but it is desirable that they do so when considered together.

Figure 15:
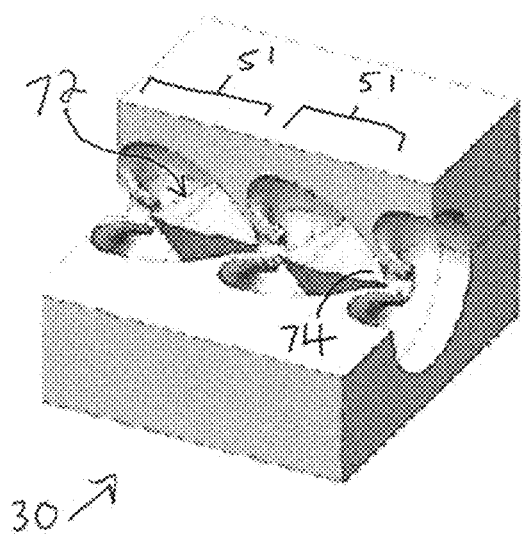
FIGS. 15-18 each show a cut-away perspective view of a portion of a process fluid passage in accordance with embodiments of the present disclosure.
Figure 16:
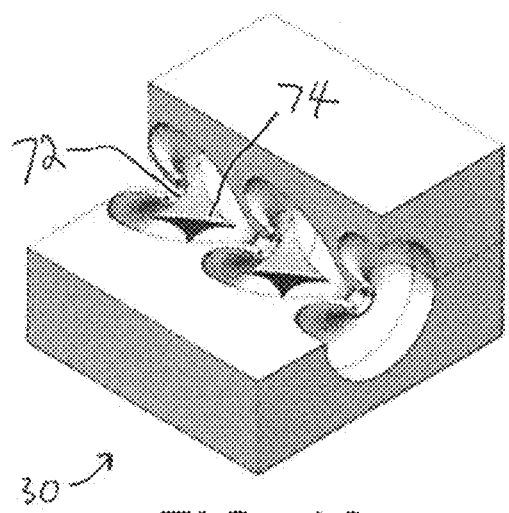
Figure 17:
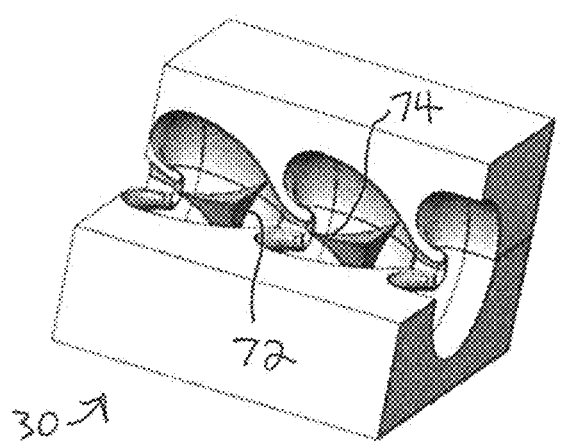
Figure 18:
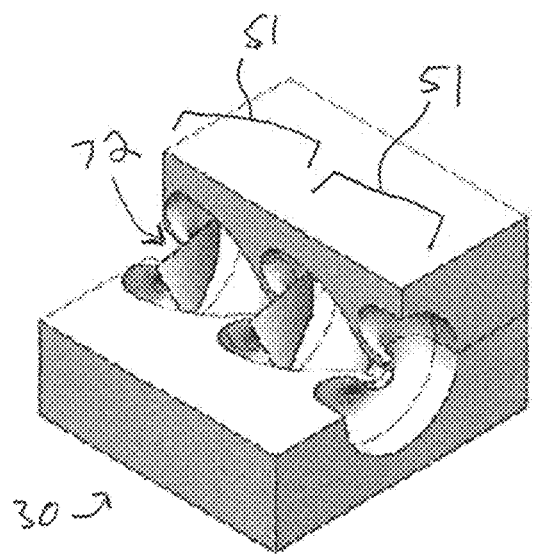

In some embodiments, the chambers 52 may have or almost have rotational symmetry, such that the height and width of the chambers are both considered instead as a diameter. FIGS. 13-18 each show a cut-away perspective view of a portion of a process fluid passage in which the portion 30 of the passage 20, as well as the successive chambers 51, have rotational symmetry. In embodiments such as these, three or more bypass paths may be used. In embodiments, the obstacles 50 comprise a flat or concave surface 72 aligned generally perpendicularly to the portion 30 of the process fluid passage 20. The surface 72 may preferably face in an upstream direction as shown in the embodiments of FIGS. 15, 16, and 18, but in alternative embodiments may face in a downstream direction as in the embodiment of FIG. 17.

Figure 19:
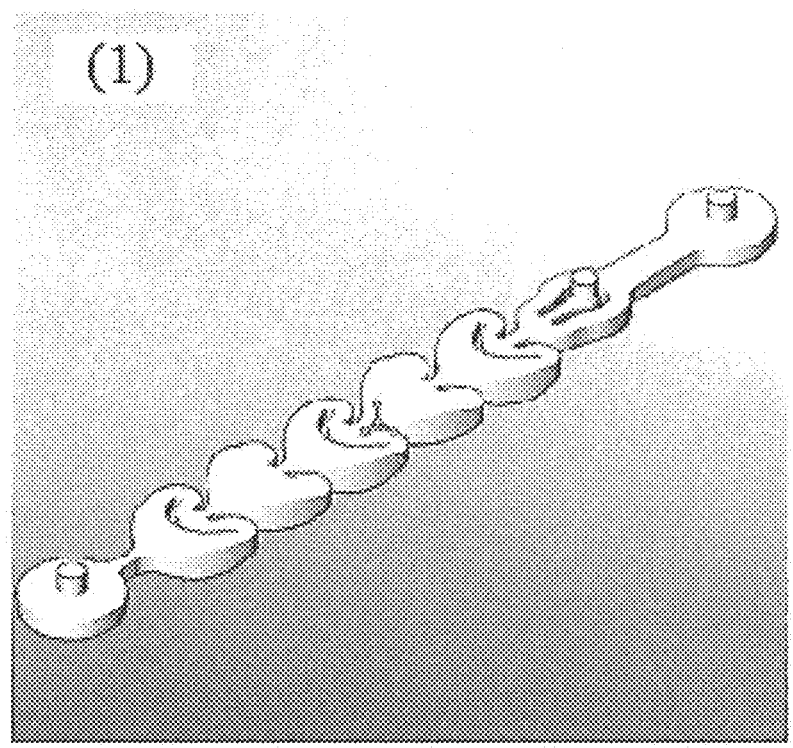
FIG. 19 shows a three-dimensional perspective view of a portion of a process fluid passage in accordance with embodiments of the present disclosure.
Figure 20:
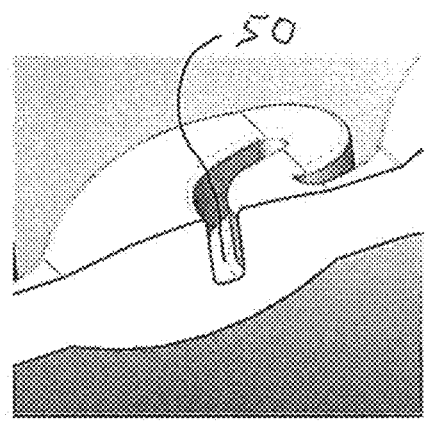
FIG. 20 shows a cross-sectional view of a chamber of the passage of FIG. 19.
Figure 25:
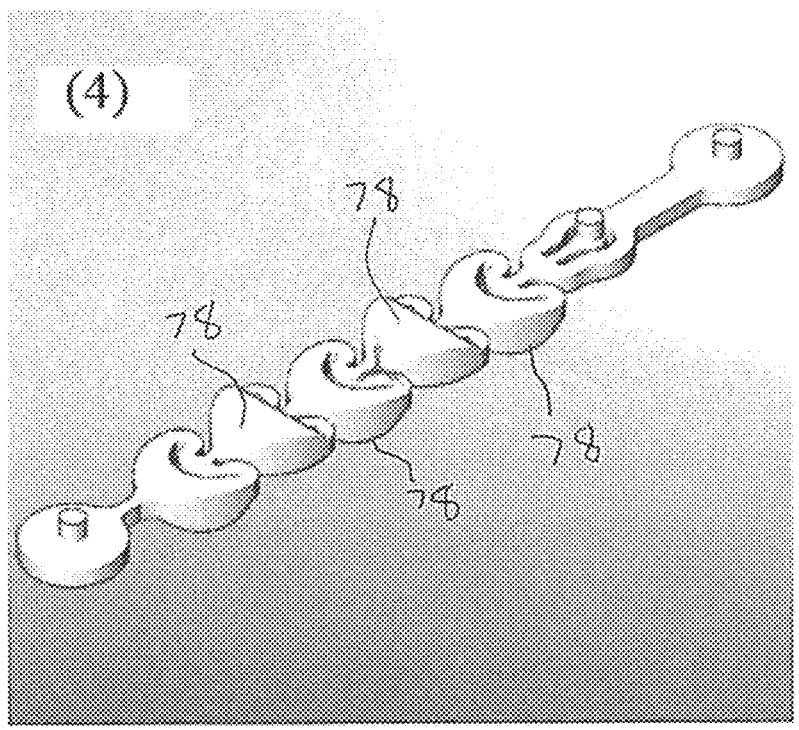
FIG. 25 shows a three-dimensional perspective view of a portion of a process fluid passage in accordance with embodiments of the present disclosure.
Figure 37:
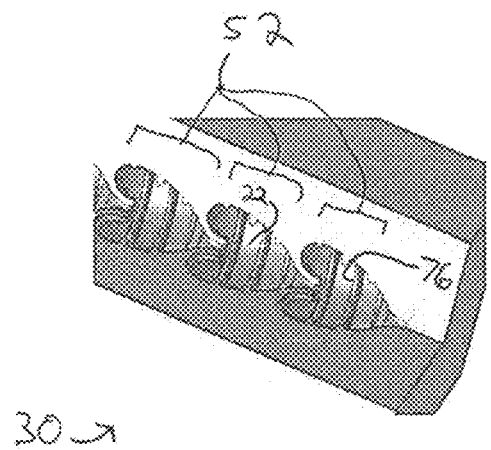
FIG. 37 each show a cut-away perspective view of walls of a portion of a process fluid passage in accordance with embodiments of the present disclosure.
Figure 38:
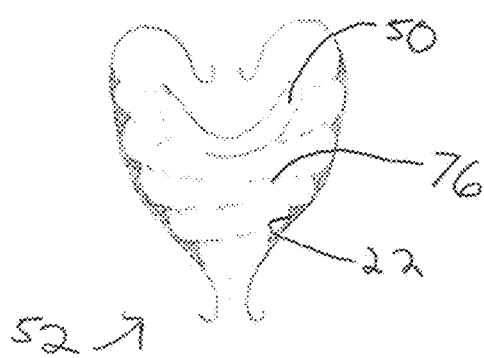
FIG. 38 shows a cross-sectional plan view of a chamber of a portion of a process fluid passage in accordance with embodiments of the present disclosure.
Figure 26:
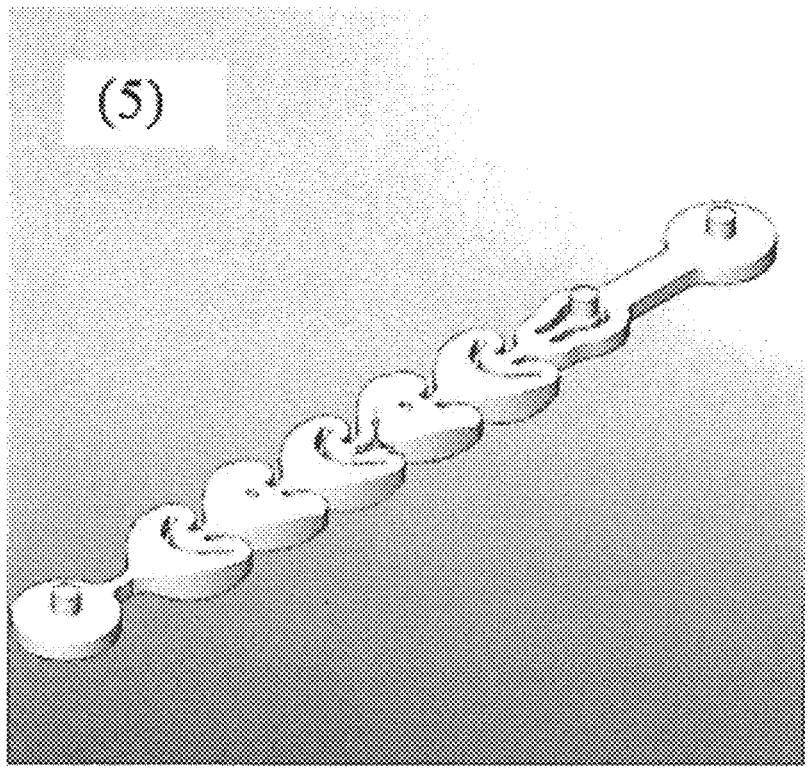
FIG. 26 shows a three-dimensional perspective view of a portion of a process fluid passage in accordance with embodiments of the present disclosure.
Figure 27:
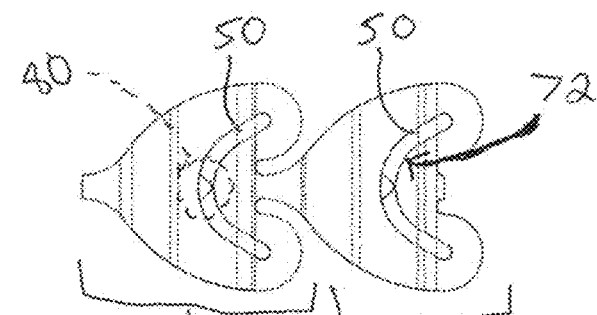
FIG. 27 shows a transparent plan view of a portion of the process fluid passage in FIG. 26.
Figure 28:
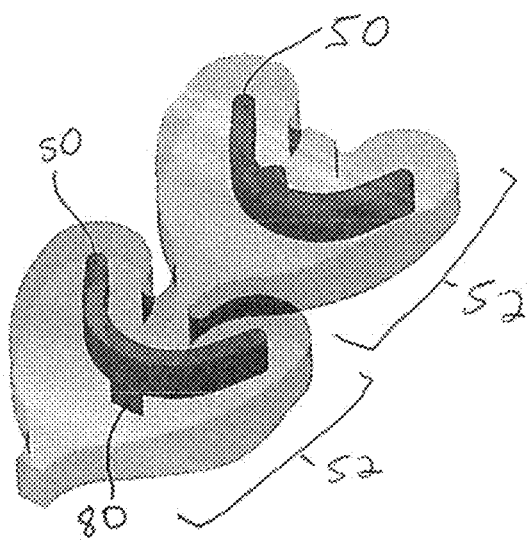
FIG. 28 shows a translucent perspective view of a portion of the process fluid passage in FIG. 26.
Figure 29:
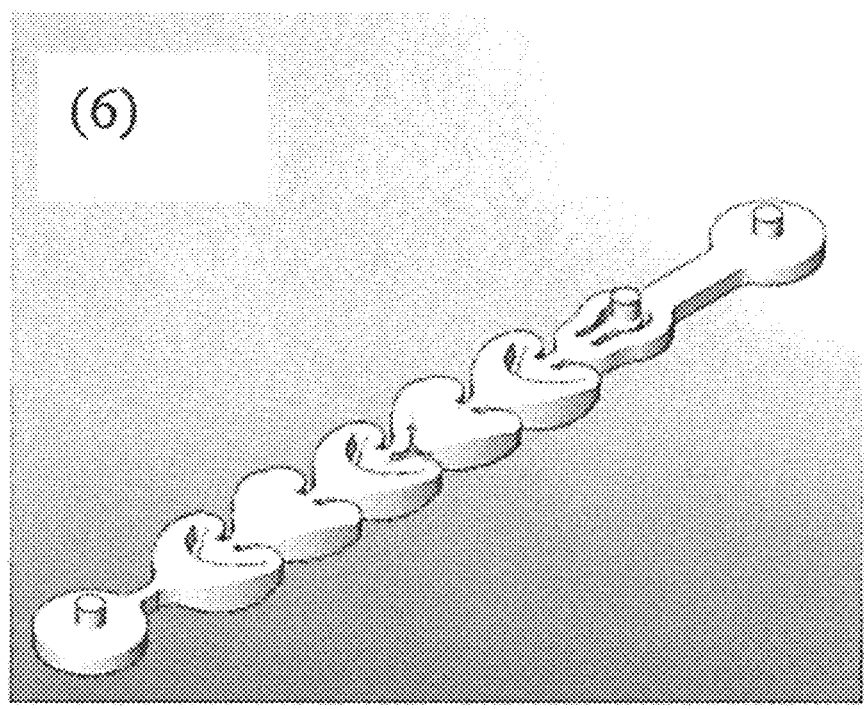
FIG. 29 shows a three-dimensional perspective view of a portion of a process fluid passage in accordance with embodiments of the present disclosure.
Figure 30:
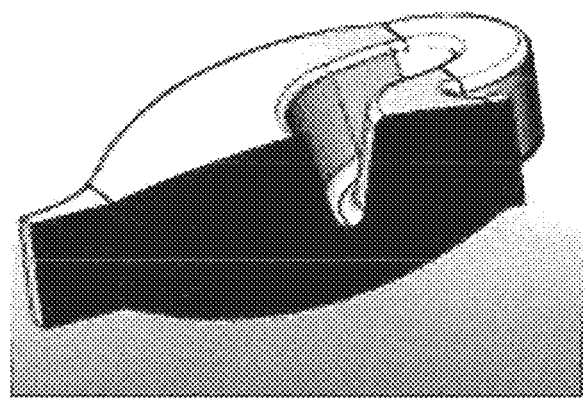
FIG. 30 shows a cross-sectional view of a chamber of the passage of FIG. 29.
Figure 31:
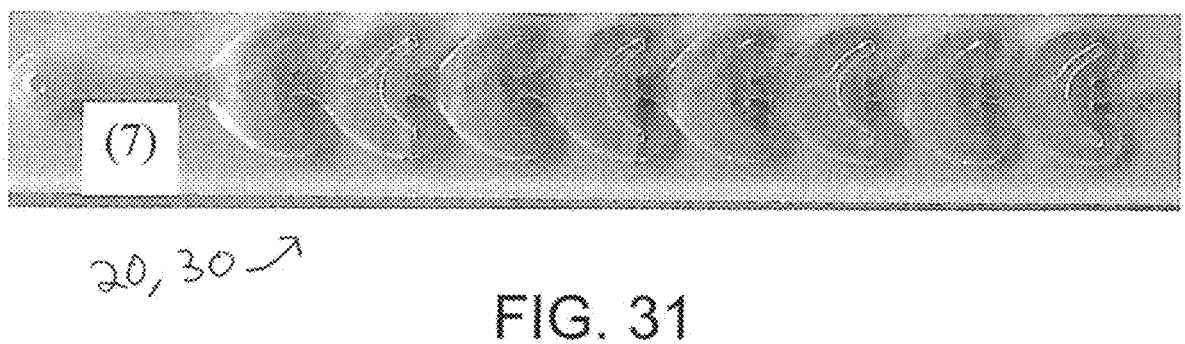
FIG. 31 shows a plan view of a portion of a process fluid passage in accordance with embodiments of the present disclosure.
Figure 32:
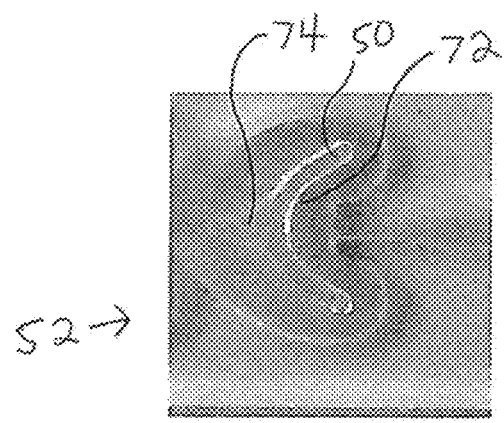
FIG. 32 shows a plan view of a chamber of the passage of FIG. 31.

FIGS. 19-32 show embodiments which were fabricated and performance tested in comparison to a reference embodiment (the embodiment of FIGS. 1-3). (The embodiment of FIG. 25 has chambers 52 similar to those of the embodiment of FIG. 19, except raised "ceilings" and lowered "floors" 78, relative to the embodiment of FIG. 19. Results are shown in FIGS. 33-36.

Figure 33:
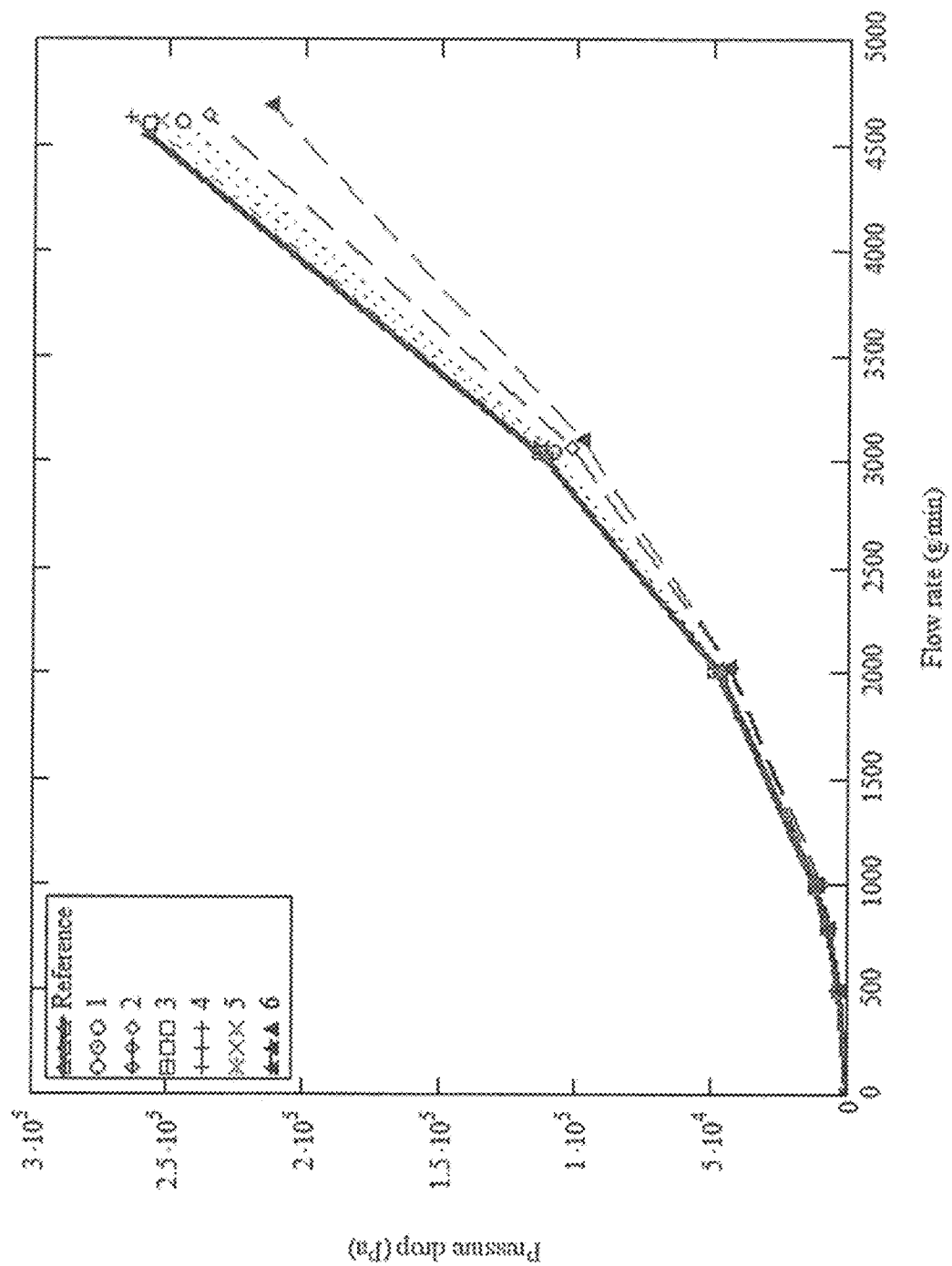
FIG. 33 is a graph of measured pressure drop as a function of flow rate as obtained from process fluid passages in accordance with embodiments of the present disclosure.
Figure 34:
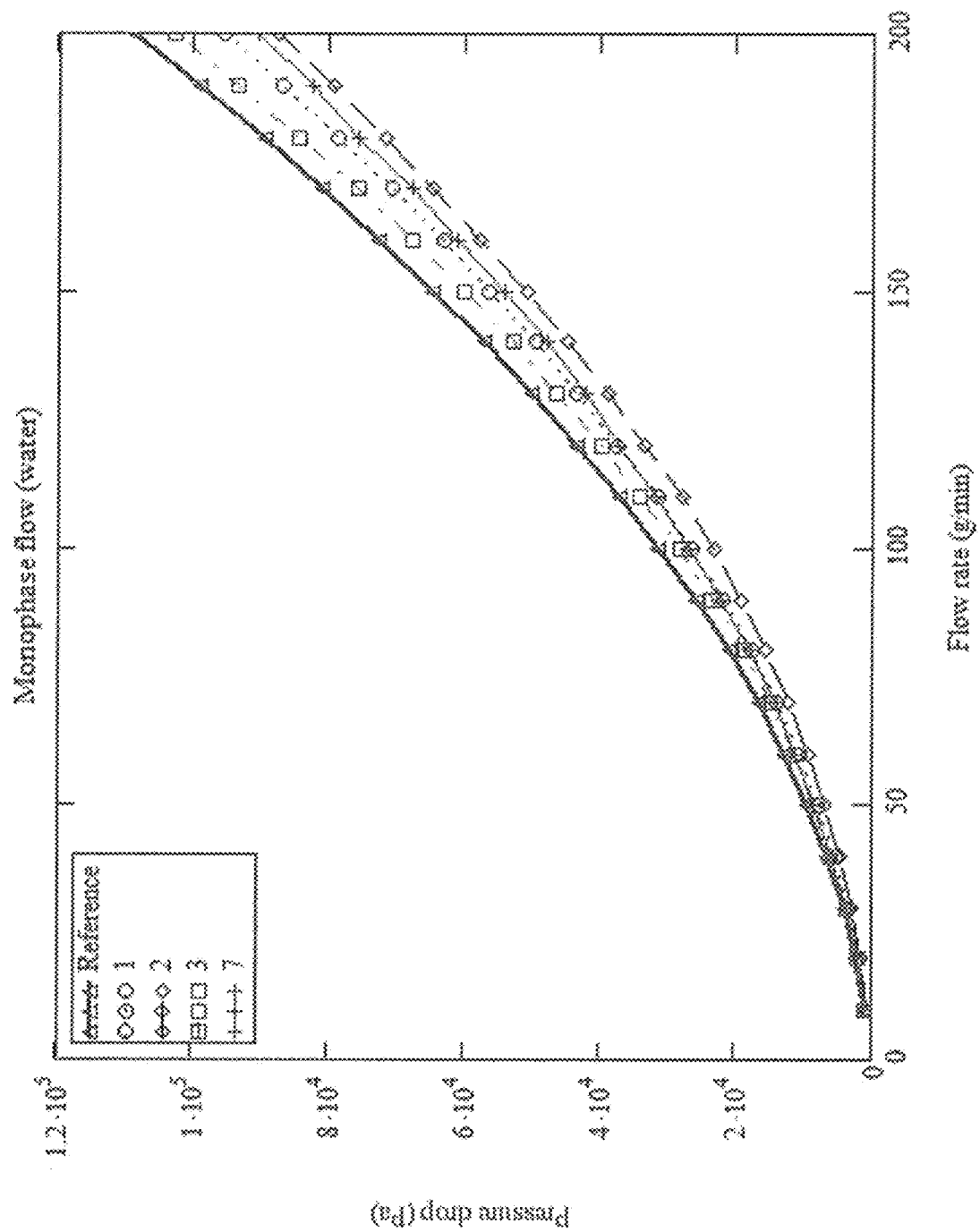
FIG. 34 is a graph of measured pressure drop as a function of flow rate as obtained from process fluid passages in accordance with embodiments of the present disclosure.

FIGS. 33 and 34 are graphs of measured pressure drop. FIG. 33 results are from relatively larger scale passages, FIG. 34 from relatively smaller scale passages. The numbers in the keys correspond to the numbers given for each embodiment in FIGS. 19-32. As seen in FIGS. 33 and 34, all tested embodiments outperformed the reference embodiment in achieving lower pressure drop.

Figure 35:
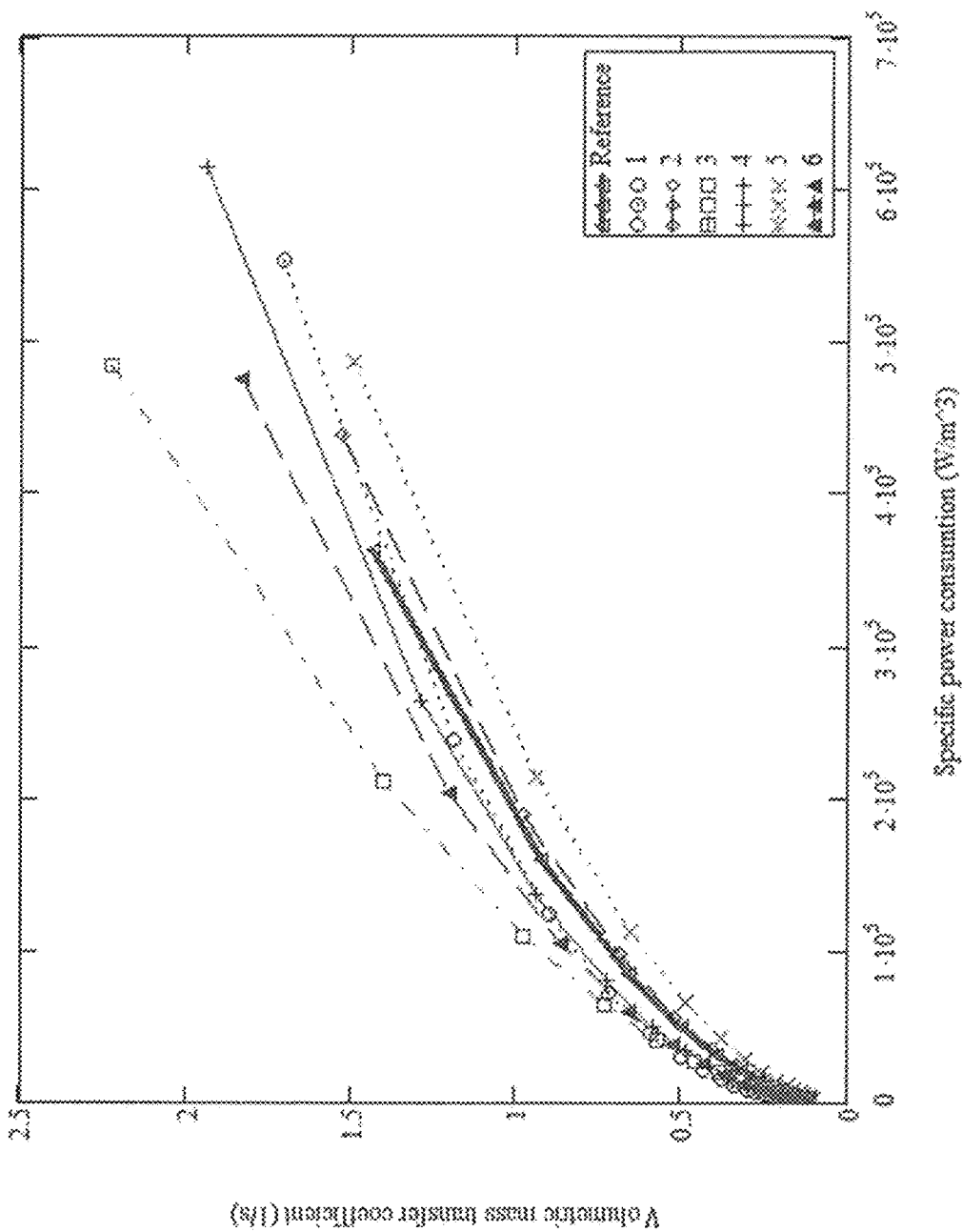
FIG. 35 is a graph of measured volumetric mass transfer coefficient as a function of specific power consumption as obtained from process fluid passages in accordance with embodiments of the present disclosure.
Figure 36:
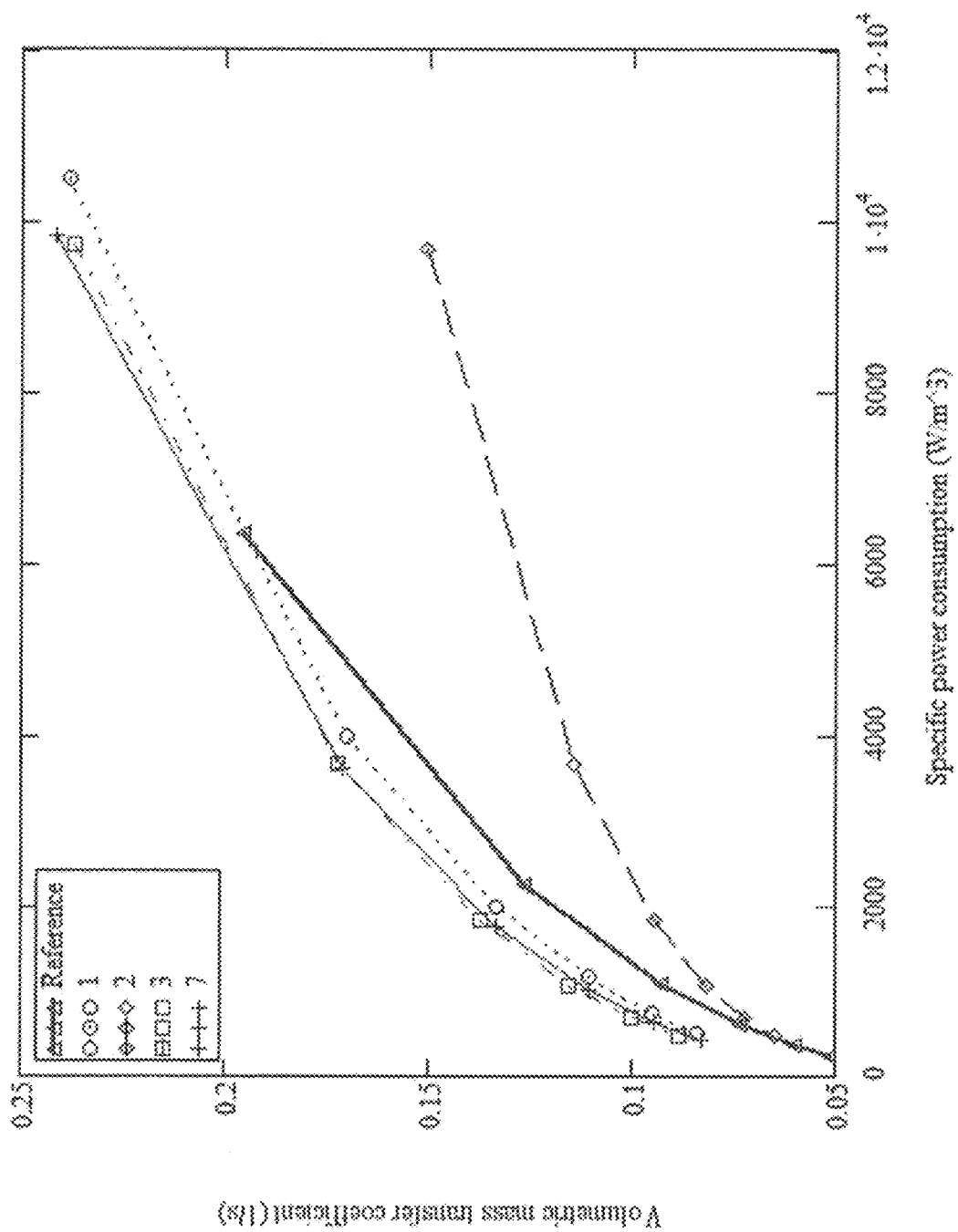
FIG. 36 is a graph of measured volumetric mass transfer coefficient as a function of specific power consumption as obtained from process fluid passages in accordance with embodiments of the present disclosure.

FIGS. 35 and 36 are graphs of measured volumetric mass transfer coefficient as a function of specific power consumption, with FIG. 35 results from relatively larger scale passages and FIG. 36 results from relatively smaller scale passages. As seen in FIG. 35, all tested embodiments other than number 2 and 5 outperformed the reference on this measure and in FIG. 36 all other than number 2. Accordingly, it is believed to be desirable to have no openings extending through the obstacles (as in embodiment number 2). Similarly, it is believed to be desirable to have the bypass paths, when there are two (or possibly more) in a chamber, separated by the obstacle by a distance of at least 2, 2.5, 3, 3.5 or even 4 times a maximum diameter of the exit of the chamber, unlike in embodiment number 5 in which a post or wedge 80 separates two bypass paths by only a short distance.

According to embodiments, the interior surface 22 (of the portion 30) passage 20 may include an internal screw thread structure 76 to impart an additional, helical motion to the fluid moving in the portion of the passage.

It will be appreciated that the various disclosed embodiments can involve particular features, elements or steps that are described in connection with that particular embodiment. It will also be appreciated that a particular feature, element or step, although described in relation to one particular embodiment, can be interchanged or combined with alternate embodiments in various non-illustrated combinations or permutations.

It is to be understood that, as used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments can be disclosed using the transitional phrase "comprising," it is to be understood that alternative embodiments, including those that can be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A module for a flow reactor, comprising:
a module body defining a fluid passage therein, the fluid passage having an interior surface and comprising a portion, the portion including (i) an input end and an outlet end at which process fluid is configured to flow into the portion and out of the portion, respectively, (ii) a plurality of successive chambers each with a nozzle-like entrance and a narrowing exit, and (iii) a cross section delimited by the interior surface of the fluid passage along the portion,
wherein the cross section has a cross-sectional shape that varies continually along the portion, wherein the interior surface includes no pairs of opposing flat parallel sides at least along portions other than one or more of the entrance and the exit to the successive chambers, and wherein a plurality of obstacles are positioned along the portion between the input end and the output end.

2. The module of claim 1, wherein one chamber of said successive chambers is nested with a next-succeeding chamber of said successive chambers such that the narrowing exit of the one chamber forms the nozzle-like entrance of the next adjacent succeeding chamber.

3. The module of claim 1, wherein at least one of the plurality of obstacles is located within a first chamber and intersects a straight line having a first endpoint located at a center of the entrance of the first chamber and a second endpoint locate at a center of the exit of the first chamber.

4. The module of claim 3, wherein the at least one of the plurality of obstacles intersects every straight line having a first end point within the entrance of the first chamber and a second endpoint within the exit of the first chamber.

5. The module of claim 3, further comprising one or more bypass paths, positioned between the at least one obstacle and an inside surface of the first chamber, around the at least one obstacle of the plurality of obstacles.

6. The module of claim 5, wherein the one or more bypass paths have a total cross-sectional area greater than the total cross-sectional area of the exit of the first chamber.

7. The module of claim 5, wherein the at least one obstacle has one or more openings extending through the at least one obstacle.

8. The module of claim 5, wherein the at least one obstacle has no openings extending through the at least one obstacle.

9. The module of claim 3, wherein the at least one obstacle of the plurality of obstacles comprises at least one obstacle per chamber.

10. The module of claim 3, further comprising two or more obstacles in a single chamber.

11. The module of claim 10, wherein the two or more obstacles in a single chamber extend from opposite sides of the interior surface.

12. The module of claim 3, wherein the at least one obstacle has two or more bypass paths.

13. The module of claim 12, wherein the bypass paths are separated by the obstacle by a distance of at least twice a maximum diameter of the exit of the chamber.

14. The module of claim 3, wherein the at least one obstacle has a single bypass path.

15. The module of claim 3, wherein the at least one obstacle has two bypass paths, the two bypass paths positioned on opposite sides of the fluid passage relative to one another.

16. The module of claim 1, wherein the at least one of the plurality of obstacles comprises a flat or concave surface aligned generally perpendicularly to the fluid passage, the flat or concave surface facing in a downstream direction or an upstream direction.

17. The module of claim 1, wherein the at least one of the plurality of obstacles comprises a tapering elongated end pointing in a downstream direction or an upstream direction.

18. The module of claim 1, wherein the interior surface of the portion comprises a height that varies periodically along the portion.

19. The module of claim 18, wherein one or more of:
the height varies periodically with a length of each of the successive chambers such that the successive chambers are essentially identical, and
a period of variation in the height of the portion is different than the length of each successive chamber such that the successive chambers are different.

20. The module of claim 1, wherein at least one of the plurality of obstacles extends only partially across a height of the chamber and a cross section of the at least one obstacle varies along a height of the obstacle.

* * * * *